2 Sheets—Sheet 1

A. E. HOBSON.

Assignor of one-half to I. J. STEANE & Co.

HYDRAULIC SHAPING PRESS.

No. 10,934. Reissued May 29, 1888.

Witnesses
J. Sobrier
Wm. J. Roach

Inventor
Arthur E. Hobson
By his attorneys
Gifford & Brown

2 Sheets—Sheet 2.

A. E. HOBSON.

Assignor of one-half to I. J. STEANE & Co.

HYDRAULIC SHAPING PRESS.

No. 10,934. Reissued May 29, 1888.

Witnesses
J. E. Greer
M. L. Roach.

Inventor
Arthur E. Hobson
By his attorneys
Gifford & Brown

UNITED STATES PATENT OFFICE.

ARTHUR E. HOBSON, OF HARTFORD, CONNECTICUT, ASSIGNOR OF ONE-HALF TO I. J. STEANE & CO., OF SAME PLACE.

HYDRAULIC SHAPING-PRESS.

SPECIFICATION forming part of Reissued Letters Patent No. 10,934, dated May 29, 1888.

Original No. 381,242, dated April 17, 1888. Application for reissue filed May 5, 1888. Serial No. 272,984.

*To all whom it may concern:*

Be it known that I, ARTHUR E. HOBSON, of Hartford, in the county of Hartford and State of Connecticut, have invented a new and Improved Hydraulic Shaping-Press, of which the following is a full, clear, and exact description.

This invention relates to hydraulic presses, the object of the invention being to provide a press by means of which embossed-faced articles or articles of irregular contour may be produced.

I will describe the invention in detail, and then point out the novel features in claims.

Reference is to be had to the accompanying drawings, forming a part of this specification, in which similar figures of reference designate corresponding parts in all the views.

Figure 1:
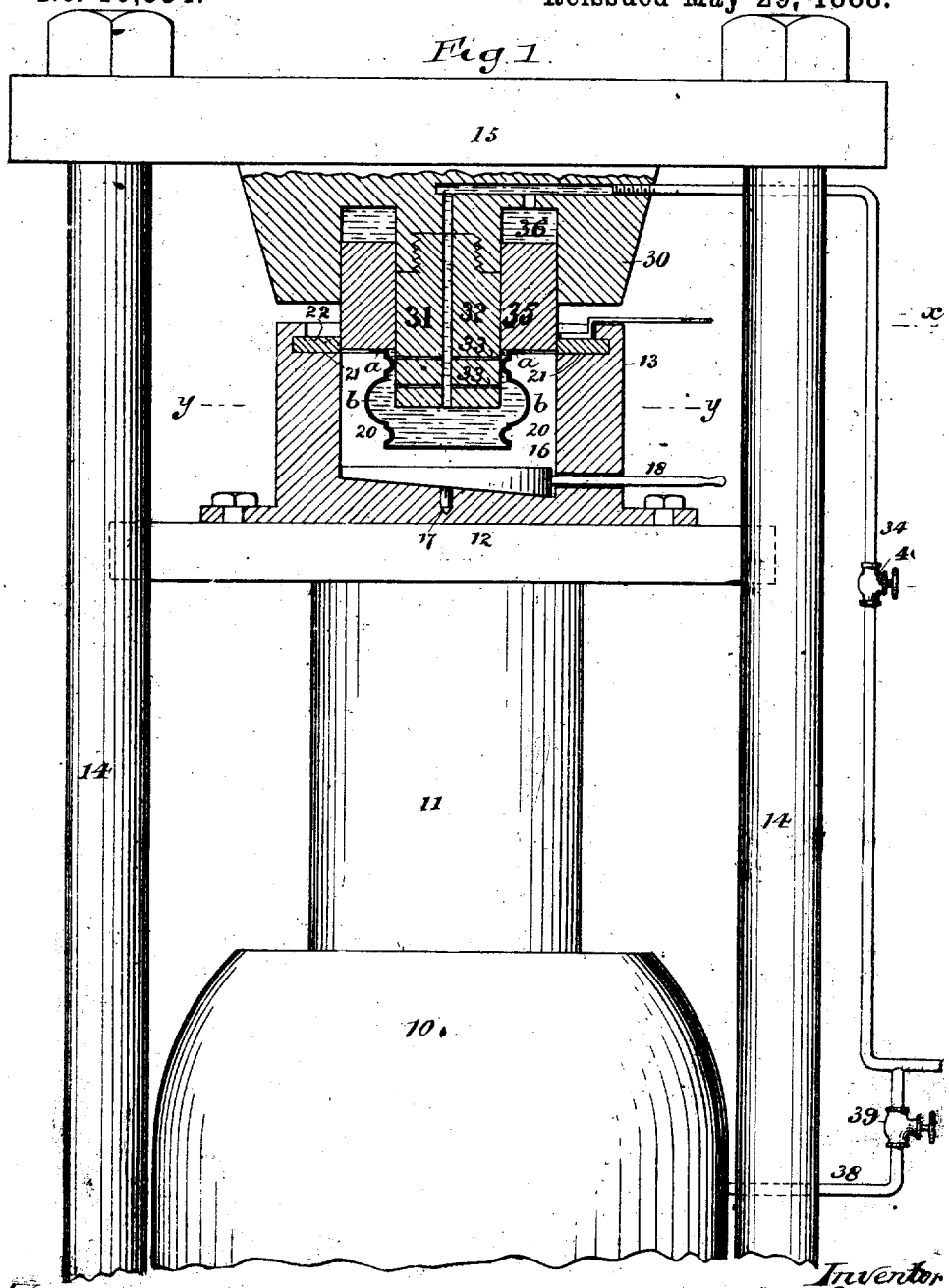
Figure 2:
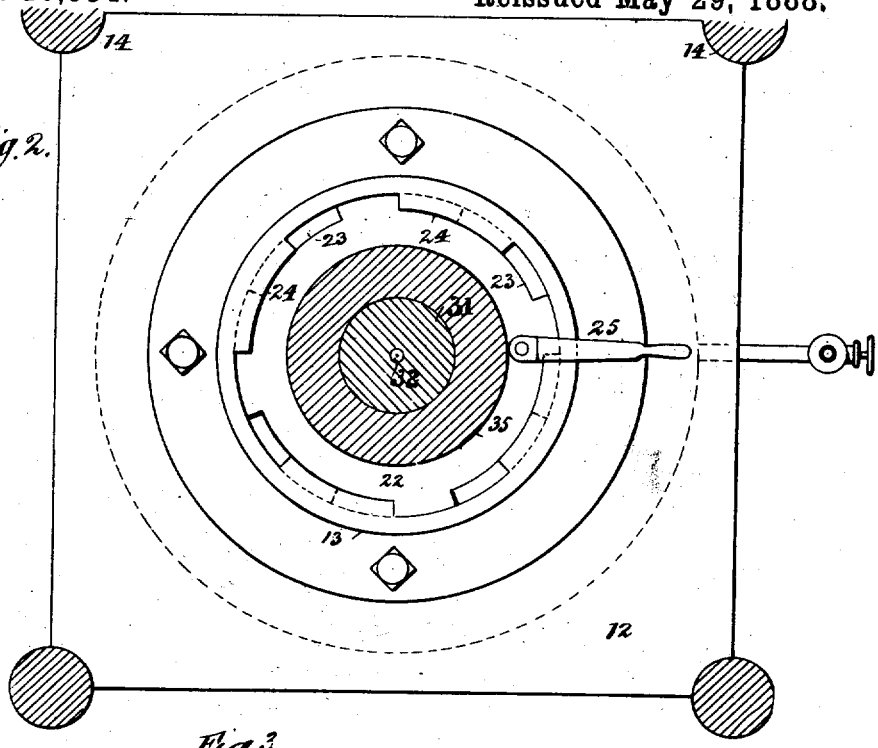
Figure 3:
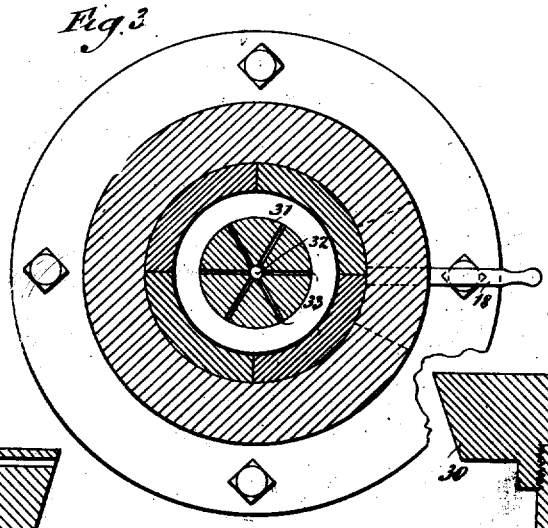
Figure 4:
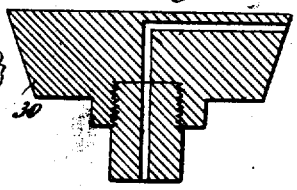
Figure 5:
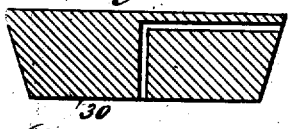

Figure 1 is a central sectional elevation of my improved form of shaping-machine. Fig. 2 is a sectional plan view taken on line *x x* of Fig. 1. Fig. 3 is a sectional plan view taken on line *y y* of Fig. 1, simply the die-holder and its connections being shown in this view. Fig. 4 is a cross sectional view of a modified form of head-block, and Fig. 5 is a similar view of a still further modification.

In constructing such a press as the one forming the subject-matter of this application I provide a main cylinder, 10, in which there is mounted a ram, 11, that carries a bed-plate, 12, upon which there is secured a die-holder, 13, the bed-plate being guided by vertical columns 14, which carry an upper plate, 15, to which there is connected a head-block, 30. In the bottom of the die-holder 13 there will be seen a wedge shaped plate, 16, that is centrally guided by a pin, 17, this plate being provided with a lever arm or handle, 18, which extends outward through the die-holder.

The die 20 is shown as made in two or more sections, and these sections are placed above the wedge-shaped plate 16 within the holder 13, the arrangement being such that when it is desired to remove the die-sections said sections may be slightly raised by turning the handle 18, as will be readily understood from the construction shown. Then they can be taken out. As shown, the holder 13 is formed with a shoulder, 21, which is arranged upon a level with the upper edges of the dies, and upon this shoulder there is placed a plate, 22, formed with recesses 23 in its peripheral face, said recesses being formed in order that the plate may be placed upon the shoulder 21, the die-holder being formed with projections 24, which enter the recesses 23 at the time when the plate 22 is being placed in position. After the plate has been placed upon the shoulder 21, it is turned by means of a lever arm or handle, 25, so that the upper faces of the projections between the recesses 23 will pass beneath the projections 24 of the die-holder 13. When in this position, the plate, being over the edge of the blank *b*, will act to hold the blank *b* and prevent it from being wrinkled when drawn, as will be readily understood. This plate will not, however, prevent the edge of the blank from being drawn beyond the plate at the proper time.

The head-block 30, as shown in Figs. 1 and 4, is provided with a plunger, 31, in which there is formed a central bore, 32, and lateral passages 33, the bore 32 being placed in communication with a water-supply pipe, 34. Ordinarily there would be placed about the plunger 31 a ram, 35. (Shown in Figs. 1 and 2 as annular in form.) The water-chamber 36 for this ram is in the head-block 30, said water-chamber also being in communication with the water-supply pipe 34. A branch pipe, 38, leads from the pipe 34, and this pipe 38 is connected with the cylinder 10, valves 39 and 40 being arranged as illustrated.

The central aperture in the plate 22 is, as shown in Fig. 1, of such size as to permit the annular ram 35 to pass downward about the plunger 31 to a position such that it will bear directly upon the edge of the blank after such blank has been drawn down within the die, and in so bearing upon the edge of the blank will force the under side of the flange formed at the edge of the blank hard against the upper face of the die and thereby form a water-tight joint, the metal of the blank *b* being softer than that from which the dies and the annular ram are formed. Such a water-tight joint as has been described cannot be so well obtained by other means.

In operation the blank from which the article is to be formed is placed upon the die 20, being held to place by the plate 22, that is adjusted as described. The valve 39 is then opened and the valve 40 closed, whereby the ram 11 will be raised and the plunger 31 will force the blank downward within the dies, the flange *a* of the blank *b* being drawn from beneath the plate 22 and pressed at this time hard against the upper edge of the sectional die. After this has been done water is admitted through the pipe 34 to the bore 32 of the plunger, passing thence downward to bear against the blank, forcing it outward against the die. After water has passed through the plunger 31 and partially shaped the blank, the valve 39 is closed and the ram 35 is forced down by the water-pressure in the chamber 36, so that the plunger will be partially withdrawn from within the die, as shown in Fig. 1, the ram 11 being also forced downwardly to admit of this. The valve 40 is then closed and the valve 39 opened, whereby the ram 11 will be raised, and in raising will cause the water within the blank to force said blank outward and cause it to conform accurately with the face of the die.

By arranging the flange *a* as above described a perfectly water-tight joint is produced, said joint being maintained when the upper ram is forcing the lower ram down or when the lower ram is brought to bear against the upper ram. In certain styles of work it will of course be understood that instead of an upper ram and plunger there might be a flat-faced head-block having a central bore or aperture, as shown in Fig. 5, or there might be a solid downwardly-extending ring surrounding the plunger, said ring being rigidly connected to or made integral with the head-block, as shown in Fig. 4; but in practice I prefer the construction illustrated in Fig. 1, as by means of such construction I am able to maintain a water-tight joint between the upper edge of the die and the blank flange, even though the supply of water be cut off from the lower ram and the full force of the pumps be directed to the forcing of water within the partially-formed vessel, for as the lower ram settles its downward motion will be followed by the upper ram and the joint at the upper edge of the ram will be maintained.

After the blank has been pressed to the required form the ram 11 is lowered, the plate 23 removed, the handle 18 turned to raise the sectional die and the formed blank contained therein, the die-sections being raised to an extent sufficient to enable the operator to grasp and remove them from the press.

Obviously in that form of my improvement in which the head-block is provided with a ram above the die-holder and die the under surface of this ram constitutes a bearing-surface, with which the head-block is provided for holding the edge portion of the blank.

What I claim as my invention, and desire to secure by Letters Patent, is—

1. In a hydraulic shaping-press, the combination, with a ram carrying a die-holder, of a head-block provided with a bearing-surface and arranged above the die-holder, whereby the edge of the blank may be clamped to the surface beneath it, substantially as described.

2. In a hydraulic shaping-press, the combination, with a die-holder, of an apertured head-block provided with a bearing-surface and arranged above the die-holder, whereby the edge of the blank may be clamped to the surface beneath it, substantially as described.

3. In a hydraulic press, the combination, with a ram, of a die-holder carried thereby, and an apertured plunger arranged to enter the die-holder, substantially as described.

4. In a hydraulic press, the combination, with a ram, of a die-holder carried thereby, and another ram arranged above the die-holder, substantially as described.

5. In a hydraulic press, the combination, with a ram, of a die-holder carried thereby, an apertured plunger above the die-holder, and a ram above the die-holder, substantially as described.

6. In a hydraulic press, the combination, with a ram, of a die-holder carried thereby, an apertured plunger arranged to enter the die-holder, and a ring surrounding the plunger, substantially as described.

7. In a hydraulic press, the combination, with a ram, of a die-holder carried thereby, an apertured plunger, and an annular ram surrounding said plunger, as and for the purpose stated.

8. The combination, with a ram, of a die-holder, and a rotary cylindric part having an inclined face and arranged beneath the cavity for the die, substantially as described.

9. The combination, with a ram, of a die-holder and a wedge-shaped block mounted within the holder, substantially as described.

10. The combination, with a ram, of a die-holder supported thereby, a wedge-shaped block mounted within the die-holder and provided with a downwardly-extending pin and an outwardly-extending lever arm or handle, substantially as described.

11. The combination, with a ram, of a die-holder carried thereby, dies adapted to fit said holder, a blank-holding plate arranged to fit within the die-holder above the die, and a head-block provided with a centrally-apertured plunger that is in connection with a water-supply, substantially as described.

12. The combination, with a ram, of a die-holder, 13, dies 20, mounted therein, a plate-holder, 22, a head-block, a plunger, 31, supported thereby and formed with a bore, 32, a ram, 35, mounted about the plunger, and a water-supply, substantially as described.

13. In a hydraulic press, the combination, with a ram, of a die-holder carried thereby, another ram arranged above the die-holder, a water-supply pipe common to both rams, branch pipes leading to the rams, and stop-cocks in said branch pipes, substantially as described.

ARTHUR E. HOBSON.

Witnesses:
EDWARD S. WHITE,
THEODORE LYMAN.